C. R. CLARE.
DISK HARROW ATTACHMENT.
APPLICATION FILED SEPT. 24, 1913.
1,124,703.
Patented Jan. 12, 1915.
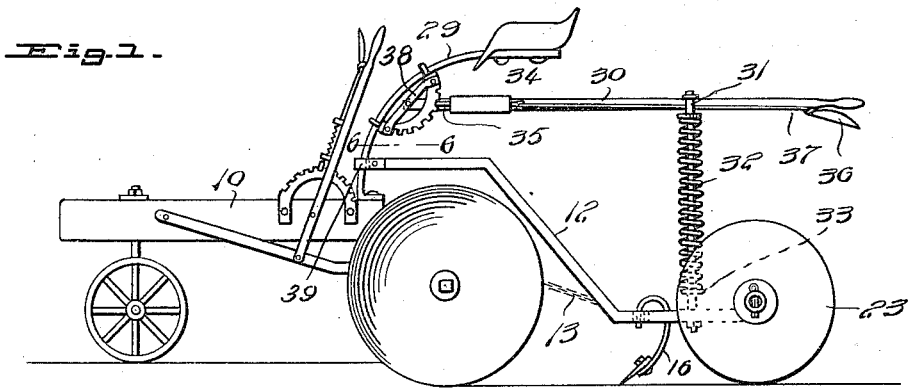
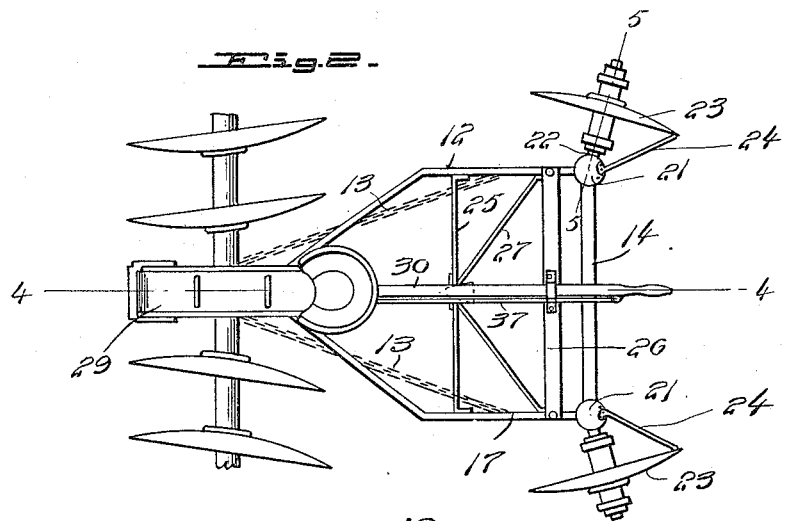
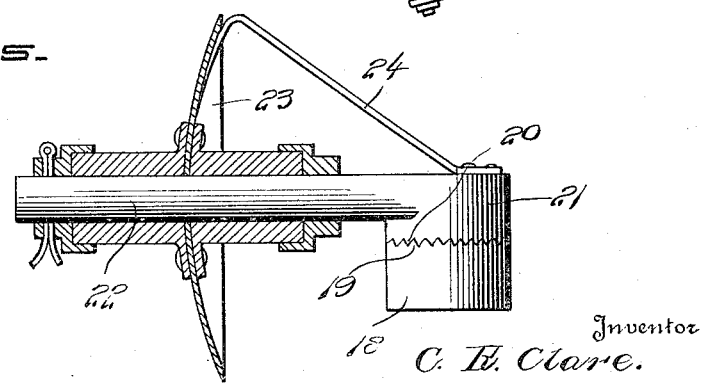

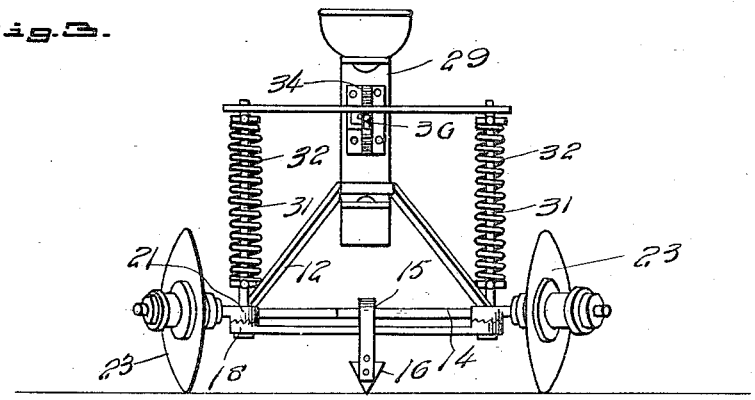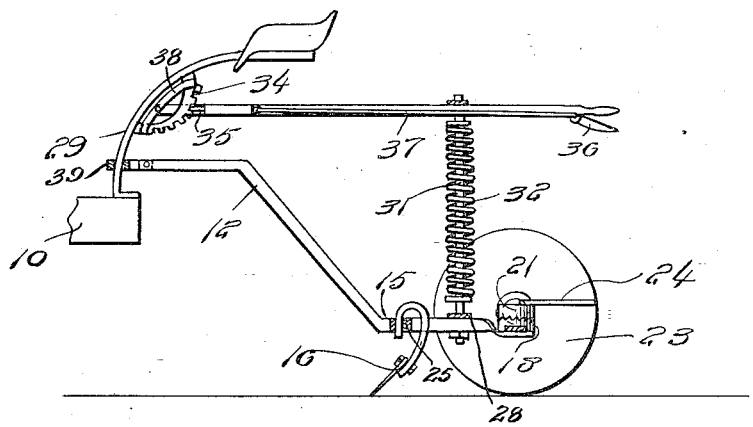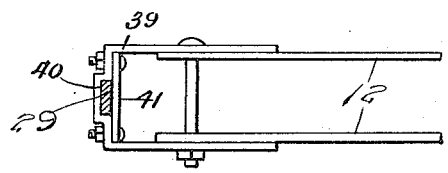

UNITED STATES PATENT OFFICE.

CHARLIE R. CLARE, OF LADDONIA, MISSOURI.

DISK-HARROW ATTACHMENT.

1,124,703.  Specification of Letters Patent.  Patented Jan. 12, 1915.

Application filed September 24, 1913. Serial No. 791,595.

*To all whom it may concern:*

Be it known that I, CHARLIE R. CLARE, a citizen of the United States, residing at Laddonia, in the county of Audrain, State of Missouri, have invented certain new and useful Improvements in Disk-Harrow Attachments; and I do hereby declare the following to be a full, clear, and exact description of the invention, such as will enable others skilled in the art to which it appertains to make and use the same.

This invention relates to improvements in harrow attachments.

The principal object of the invention is to provide a simple attachment for a harrow which is constructed and arranged to fill or cover a furrow.

Another object is to provide a device of this character which is simple in construction and which is adjustable according to the size of the furrow to be covered.

Other objects and advantages will be apparent from the following description, when taken in connection with the accompanying drawings.

In the drawings: Figure 1 is a side elevation of a portion of a harrow showing my invention applied thereto. Fig. 2 is a top plan view. Fig. 3 is a rear elevation. Fig. 4 is a longitudinal sectional view on the line 4—4 of Fig. 2. Fig. 5 is a transverse sectional view on the line 5—5 of Fig. 2, slightly enlarged. Fig. 6 is a transverse sectional view on the line 6—6 of Fig. 1.

When it is desired to cultivate a field where corn has grown and which has been harvested, as well as the stalks cut out for fodder, the stumps or stubble must necessarily be removed. To do this it is necessary to run down the rows with a plow to dig them up. This leaves furrows which must be filled to make the field level. To do this is the principal object of the invention.

Referring particularly to the accompanying drawings, 10 represents the frame of the harrow to which my invention is connected.

My invention comprises an elongated frame including side members 12 which is connected to the frame of the harrow in a manner to be later described and carries the chains 13 which are connected to the side portions of the frame 10. Extending transversely of the rear portion of the frame 12 is a bar 14. On the rear end of each of the side bars 17 is formed a block 18 the upper face of which is formed with teeth 19 for engagement with teeth 20 formed on a block 21, forming a part of one of the stub axles 22. Mounted on each of the stub axles is a concavo-convex disk 23. Adjustably carried by each one of the blocks 21 is a scraper blade 24 which bears on the convex face of the disk 23 near the outer side thereof, to keep the disk free from clogging. The frame 12 is suitably braced by the transverse braces 25 and the inclined braces 27, a transverse bar 28 connecting the rear portions of the side bars 17 and holding them in proper spaced relation. On the bar 25 is a clip 15 which supports the shovel 16. Secured to the seat spring 29 of the cultivator or harrow is a rearwardly extending bar 30, the rear end of which is secured to a transverse member 26 which carries the depending bolts 31 at the ends thereof, these bolts being slidable vertically through the member. Each of the bolts 31 carries a coil spring 32, which bears with one end on the outer end of the bar and the other end on a collar 33 adjacent the lower end of the bolt. The lower end of this bolt is secured to the frame 12 as clearly shown. This bar 30 is pivotally connected to the bracket 38 carried by the spring 29, and adjacent this pivot and forming a part of the bracket is a notched segment 34 which is arranged to be engaged by a spring-pressed pin 35 operable from the outer end of the bar by means of a hand lever clip 36 and the connecting link 37. By means of the lever 30, and the spring bolts 31, varying pressures can be exerted on the rear part of the frame 12 to cause the spring tooth 16 and the disks 23 to dig to various depths in the soil. The forward ends of the members 12 are secured together by means of the yoke 39. The transverse portion of the yoke has a depression 40 in which is received the seat spring 29. Secured to the yoke across the depression and bearing against the seat spring is a plate 41. It will thus be seen that with this attachment trailing at the rear of the disk harrow, or cultivator the furrows and any holes which might be left in the furrows will be completely covered and broken up, thus leveling the field.

It will be noted upon reference to Fig. 6 of the drawings that the members 12 are pivotally mounted on the yoke 39.

What is claimed is:

The combination with the frame and seat spring of a harrow, of a rearwardly extending frame including side bars detachably secured to the seat spring, flexible connections between the harrow frame and the said side members, ground treating implements carried by the rearwardly extending frame, a bracket mounted on the seat spring, a rearwardly extending lever pivotally mounted in the bracket, a transverse bar mounted on the rearwardly extending frame, a transverse bar secured to the rear portion of the said lever, rods secured to the first mentioned bar and slidably engaged through the lever carried bar, springs carried by the rods and bearing with their respective ends against the upper and lower transverse bars, said lever being arranged to be moved upwardly and downwardly on its pivot to increase or diminish the tensions of the springs.

In testimony whereof, I affix my signature, in the presence of two witnesses.

CHARLIE R. CLARE.

Witnesses:
R. G. McKibben,
J. J. Schuendker.

Copies of this patent may be obtained for five cents each, by addressing the "Commissioner of Patents, Washington, D. C."